(12) United States Patent
Xu et al.

(10) Patent No.: US 9,609,053 B2
(45) Date of Patent: Mar. 28, 2017

(54) METHOD, APPARATUS AND SYSTEM FOR VOICE SERVICE ACCESS

(71) Applicant: Tencent Technology (Shenzhen) Company Limited, Shenzhen (CN)

(72) Inventors: Xiaomin Xu, Shenzhen (CN); Jiangong Zhang, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/142,958

(22) Filed: Apr. 29, 2016

(65) Prior Publication Data
US 2016/0248851 A1 Aug. 25, 2016

Related U.S. Application Data

(63) Continuation of application No. PCT/CN2014/089654, filed on Oct. 28, 2014.

(30) Foreign Application Priority Data

Oct. 31, 2013 (CN) .......................... 2013 1 0530765

(51) Int. Cl.
*H04W 4/00* (2009.01)
*G06F 15/16* (2006.01)
(Continued)

(52) U.S. Cl.
CPC .......... *H04L 67/1008* (2013.01); *H04L 29/06* (2013.01); *H04L 29/08072* (2013.01);
(Continued)

(58) Field of Classification Search
USPC ............... 370/332, 331, 230, 235, 254, 400; 455/456.2, 456.3; 709/226, 231, 238,
(Continued)

(56) References Cited

U.S. PATENT DOCUMENTS 8,392,611 B2 * 3/2013 Leighton ........... H04L 29/12066
709/226
9,270,746 B2 * 2/2016 Lyon ................... H04L 67/1008
(Continued)

FOREIGN PATENT DOCUMENTS

CN      1856137 A     11/2006
CN      1988548 A      6/2007
(Continued)

OTHER PUBLICATIONS

Tencent Technology, ISRWO, PCT/CN2014/089654, Jan. 20, 2015, 7 pgs.
Tencent Technology, IPRP, PCT/CN2014/089654, May 3, 2016, 5 pgs.

*Primary Examiner* — Phuongchau Ba Nguyen
(74) *Attorney, Agent, or Firm* — Morgan, Lewis & Bockius LLP

(57) ABSTRACT

A scheduling server receives a voice service group access request from a user terminal, wherein the voice service group access request carries an identifier of a voice service group that a user of the user terminal is to join. The scheduling server determines a candidate voice server set according to a region where the user terminal is located and/or a network operator of the user terminal. If the number of online users in the voice service group identified by the identifier in the voice service group access request does not exceed a predefined threshold, a relationship between the voice service group and a first voice server providing services for the voice service group is found in a storage area and the first voice server belongs to the candidate voice server set, the user terminal accesses the voice service group via the first voice server.

17 Claims, 5 Drawing Sheets

(51) Int. Cl.
*H04L 29/08* (2006.01)
*H04W 36/30* (2009.01)
*H04L 29/06* (2006.01)

(52) U.S. Cl.
CPC ...... *H04L 67/1021* (2013.01); *H04L 67/1023* (2013.01); *H04W 36/30* (2013.01)

(58) Field of Classification Search
USPC .................. 709/203, 217, 225, 244, 245
See application file for complete search history.

(56) References Cited

U.S. PATENT DOCUMENTS

| | | | | |
|---|---|---|---|---|
| 2006/0150191 | A1* | 7/2006 | Masuda | G06F 11/3409 718/105 |
| 2006/0236324 | A1* | 10/2006 | Gissel | G06F 9/5083 718/105 |
| 2007/0143116 | A1* | 6/2007 | De Armas | G06F 9/505 704/270.1 |
| 2010/0172329 | A1* | 7/2010 | Yokoyama | H04W 36/30 370/332 |
| 2012/0009890 | A1* | 1/2012 | Curcio | H04L 29/06 455/230 |
| 2013/0325987 | A1* | 12/2013 | Lee | H04L 51/046 709/206 |

FOREIGN PATENT DOCUMENTS

| | | |
|---|---|---|
| CN | 101079936 A | 11/2007 |
| CN | 101938502 A | 1/2011 |
| CN | 103166979 A | 6/2013 |
| CN | 103188270 A | 7/2013 |
| CN | 103297297 A | 9/2013 |
| CN | 103312907 A | 9/2013 |
| CN | 103561022 A | 2/2014 |
| EP | 001868341 a1 * | 12/2007 ............ H04L 29/06 |

* cited by examiner

METHOD, APPARATUS AND SYSTEM FOR VOICE SERVICE ACCESS

PRIORITY STATEMENT AND RELATED APPLICATIONS

This application is a continuation application of PCT Patent Application No. PCT/CN2014/089654, entitled "METHOD, APPARATUS AND SYSTEM FOR VOICE SERVICE ACCESS" filed on Oct. 28, 2014, which claims the benefit of Chinese Patent Application No. 201310530765.1, entitled "METHOD, APPARATUS AND SYSTEM FOR VOICE SERVICE ACCESS" filed on Oct. 31, 2013, both of which are incorporated herein in their entirety by reference.

TECHNICAL FIELD

The present disclosure relates to computer techniques, and more particularly, to a method, an apparatus and a system for voice service access.

BACKGROUND

Voice chat is a form of communication used on the Internet. At present, people may have a voice chat via various communication tools, such as QQ voice chat. A voice channel refers to resources used for storing voice data in a voice server. Information, such as timestamp and identifier of a user that the voice channel currently belongs to, may be recorded in the voice channel.

Users in voice chat may speak in various modes, e.g., queue mode, random mode, etc. For a multi-user voice chat scenario based on chat room, users in the chat room may come from different regions and may be subscribers of different network operators.

According to factors including the network operator of the user, region of the user and loads of voice servers, a voice server via which the user enters the voice chat room may be determined.

SUMMARY

According to an example of the present disclosure, a method for voice service access is provided. The method includes:
receiving a voice service group access request from a user terminal, wherein the voice service group access request carries an identifier of a voice service group that a user of the user terminal is to join;
determining a candidate voice server set according to a region where the user terminal is located and/or a network operator of the user terminal;
if the number of online users in the voice service group identified by the identifier in the voice service group access request does not exceed a predefined threshold, a relationship between the voice service group and a first voice server providing services for the voice service group is found in a storage area and the first voice server belongs to the candidate voice server set, putting the user terminal in the voice service group via the first voice server.

According to another example of the present disclosure, an apparatus for voice service access is provided. The apparatus includes:
a receiving unit, to receive a voice service group access request from a user terminal, wherein the voice service group access request includes an identifier of a voice service group that a user of the user terminal is to join;
a determining unit, to determine a candidate voice server set according to a region where the user terminal is located and/or a network operator of the user terminal;
an access unit, to put the user terminal in the voice service group if the number of online users in the voice service group identified by the identifier does not exceed a predefined threshold and a relationship between the voice service group and a first voice server providing services for the voice service group is recorded in a record maintenance unit and the first voice server belongs to the candidate voice server set; and
the record maintenance unit, to record the relationship between the voice service group and the first voice server.

According to another example of the present disclosure, a voice service system is provided. The voice service system includes:
a scheduling server and voice servers scheduled by the scheduling server;
the scheduling server is to receive a voice service group access request from a user terminal, wherein the voice service group access request carries an identifier of a voice service group that a user of the user terminal is to join; determine a candidate voice server set according to a region where the user terminal is located and/or a network operator of the user terminal; if the number of online users in the voice service group corresponding to the identifier does not exceed a predefined threshold, a relationship between the voice service group and a first voice server providing services for the voice service group is found in a storage area of the scheduling server and the first voice server belongs to the candidate voice server set, put the user terminal in the voice service group via the first voice server.

Other aspects or embodiments of the present disclosure can be understood by those skilled in the art in light of the description, the claims, and the drawings of the present disclosure.

BRIEF DESCRIPTION OF THE DRAWINGS

Features of the present disclosure are illustrated by way of example and not limited in the following figures, in which like numerals indicate like elements, in which.

DETAILED DESCRIPTION

The preset disclosure will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In a method for voice service access provided by an example of the present disclosure, a voice service group access request is received from a user terminal, wherein the voice service group access request carries an identifier of a voice service group that a user is to enter. A candidate voice server set is determined according to a region of the user terminal and/or a network operator of the user terminal. If the number of online users in the voice service group identified by the voice service group identifier does not exceed a predefined threshold, and a relationship between the voice service group and a first voice server is recorded and the first voice server belongs to the candidate voice service set, the user terminal accesses the voice service group via the first voice server.

Figure 1:
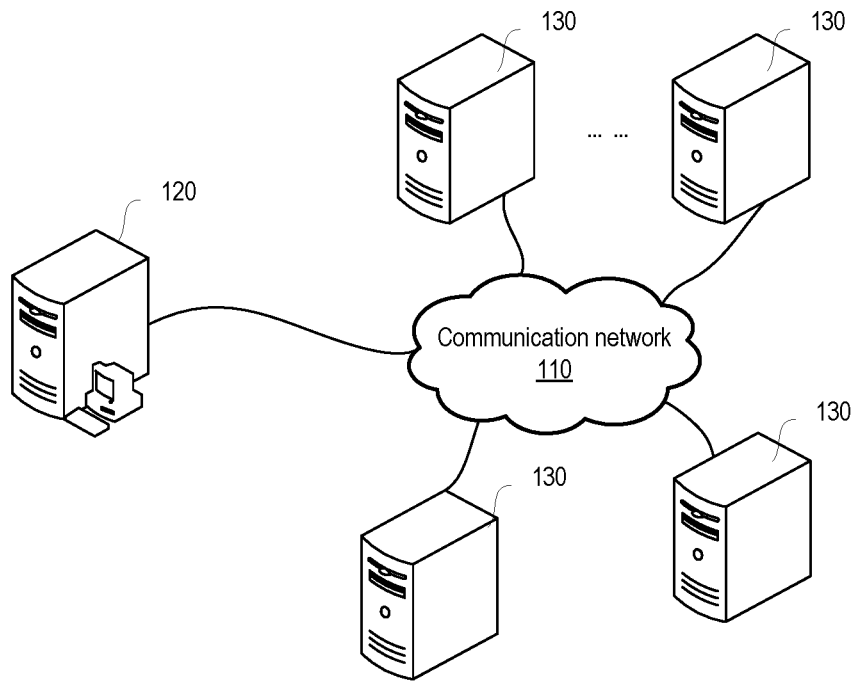
FIG. 1 shows an example of a voice service system according to the present disclosure.

FIG. 1 shows an embodiment of a voice service system according to the present disclosure. As shown in FIG. 1, the voice service system 100 includes a communication network 110, a scheduling server 120, and one or more voice servers 130.

The scheduling server 120 and the voice servers 130 in FIG. 1 respectively represents a computer system that is made available to user terminals. Various hardware components (not shown in FIG. 1) such as external monitors, keyboards, mice, tablets, hard disk drives, magnetic tapes, and other devices may be used in conjunction with the scheduling server 120 and the voice servers 130.

The scheduling server 120 assigns different voice servers 130 to user terminals. The voice servers 130 provide voice chat service to the user terminals via the communication network 110.

Hereinafter, the method provided by various examples of the present disclosure will be described more fully with reference to the voice service system 100.

Figure 2:
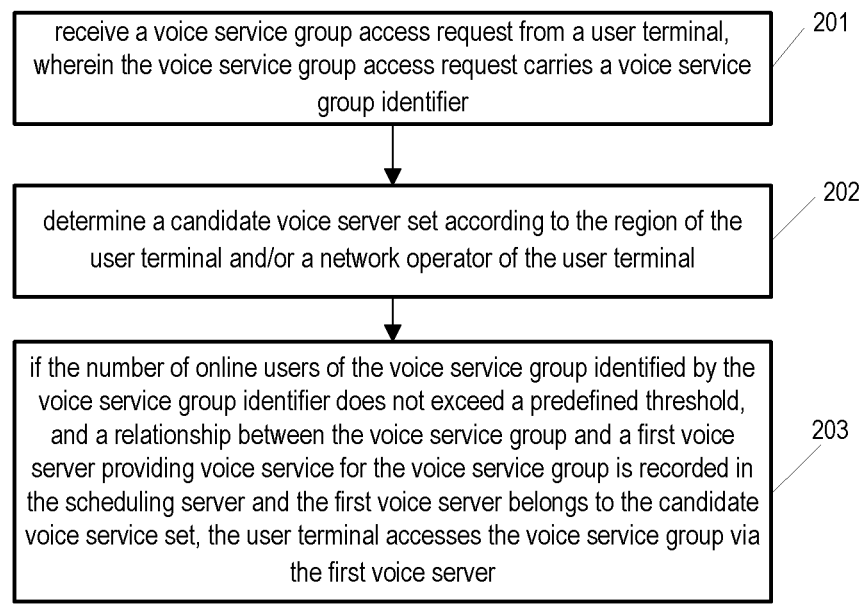
FIG. 2 shows an example of a method for voice service access according to the present disclosure.

FIG. 2 shows an example of a method for voice service access according to the present disclosure. As shown in FIG. 2, the method includes the following.

At block 201, a voice service group access request is received from a user terminal, wherein the voice service group access request carries a voice service group identifier.

When a user is to join a particular voice service group to participate in an online voice chat, the user terminal may transmit a voice service group access request to a scheduling server, wherein the voice service group access request carries a voice service group identifier of the voice service group he wants to join. The scheduling server may receive the voice service group access request of the user terminal. In various examples of the present disclosure, the user terminal may be a personal computer, a cell phone, a personal digital assistant device or other devices.

At block 202, a candidate voice server set is determined according to the region of the user terminal and/or a network operator of the user terminal.

The candidate voice server set includes one or more voice servers available for providing voice chat service to the user terminal.

At block 203, if the number of online users of the voice service group identified by the voice service group identifier does not exceed a predefined threshold, and a relationship between the voice service group and a first voice server providing voice service for the voice service group is recorded in the scheduling server and the first voice server belongs to the candidate voice service set, the user terminal accesses the voice service group via the first voice server.

In some examples of the present disclosure, the threshold may be a value between 30 and 50.

The voice service group may be a voice service room or a voice service forum or a voice service temporary group or other types of voice service groups.

The relationship between the voice service group and the voice server which provides service for the voice service group may be recorded in a storage area of the scheduling server, i.e., the scheduling server records the relationship which associates the voice service group and the voice server which provides voice service for the voice service group. If the relationship between the voice service group and the first voice server is found, it indicates that the first voice server is currently providing services for the voice service group. Similarly, if the relationship between the voice service group and a second voice server is also found, it indicates that the second voice server is also currently providing services for the voice service group. If no relationship is found, it indicates that there may be no voice server currently providing services for the voice service group.

In some examples of the present disclosure, voice servers may be selected from the voice servers corresponding to the region where the user terminal is located based on a predefined load controlling policy or other policies to form the candidate voice server set. For example, voice servers with loads lower than a threshold among the voice servers corresponding to the region of the user terminal may be selected to form the candidate voice server set.

In some examples of the present disclosure, voice servers may be selected from the voice servers corresponding to the network operator of the user terminal based on a predefined load controlling policy or other policies to form the candidate voice server set. For example, voice servers with loads lower than a threshold among the voice servers corresponding to the network operator of the user terminal may be selected to form the candidate voice server set.

In some examples of the present disclosure, voice servers may be selected from the voice servers corresponding to the region and network operator of the user terminal based on a predefined load controlling policy or other policies to form the candidate voice server set. For example, voice servers with loads lower than a threshold among the voice servers corresponding to the region and the network operator of the user terminal may be selected to form the candidate voice server set.

In some examples of the present disclosure, the method may further include: if the number of online users in the voice service group identified by the voice service group identifier does not exceed the threshold and no relationship is not found in the storage area, a second voice server is selected from the candidate voice server set, and the user terminal accesses the voice service group via the second voice server. The second voice server may be selected from the candidate voice server set based on a random algorithm or a hash algorithm or other algorithms. The hash algorithm may be modulo-hash algorithm or other hash algorithms. An input of the modulo-hash algorithm may be a numeric string corresponding to the voice service group. Denominator of the modulo-hash algorithm may be the total number of voice servers in the candidate voice server set. The numeric string may be the voice service group identifier or converted from the voice service group identifier. Thus, it may be realized that different voice servers provide services for different voice service groups. Alternatively, a voice server meeting a predefined load condition may be selected from the candidate voice server set as the second voice server. For example, a voice server whose load is lower than a threshold or has the lowest load may be selected from the candidate voice server set and taken as the second voice server. In addition, a relationship which associates the voice service group and the second voice server may be recorded in the storage area.

In some examples of the present disclosure, the method may further include: if the number of online users in the voice service group identified by the voice service group identifier does not exceed the threshold, and the relationship between the voice service group and the first voice server is found in the storage area but the first voice server does not belong to the candidate voice server set, a third voice server is selected from the candidate voice server set, and the user terminal accesses the voice service group via the third voice server. The third voice server may be selected from the candidate voice server set similarly as the second voice server. In addition, a relationship which associates the voice service group and the third voice server may be recorded in the storage area.

In some examples of the present disclosure, the method may further include: if the number of online users in the voice service group identified by the voice service group identifier exceeds the threshold, a fourth voice server is selected from the candidate voice server set, and the user terminal accesses the voice service group via the fourth voice server. The fourth voice server may be selected from the candidate voice server set similarly as the second voice server. In addition, a relationship which associates the voice service group and the fourth voice server may be recorded in the storage area.

The technical solution in the example may be implemented in the scheduling server or a voice server integrated with server scheduling function or other devices.

In view of the above, in examples of the present disclosure, after a voice service group access request is received from a user terminal, a candidate voice server set is determined according to a region and/or network operator of the user terminal. If the number of online users in the voice service group identified by a voice service group identifier carried in the voice service group access request does not exceed a threshold, a relationship between the voice service group and a first voice server is recorded in the storage area and the first voice server belongs to the candidate voice server set, the user terminal accesses the voice service group via the first voice server. Thus, in the case that the voice service group has less users, the user terminals may access the voice service group via the first voice server which is currently providing services for the voice service group as far as possible, so as to reduce forwarding times of voice chat data of users, shorten forwarding path and reduce delay. When the voice server providing voice service is selected, key factors such as region and/or network operator of the user terminal are also considered, such that influence of these factors on the delay may be balanced to obtain a stable delay index and a better user experience.

For better understand and implementation of the above technical solution provided by the examples of the present disclosure, some application scenarios are provided hereinafter.

Figure 3:
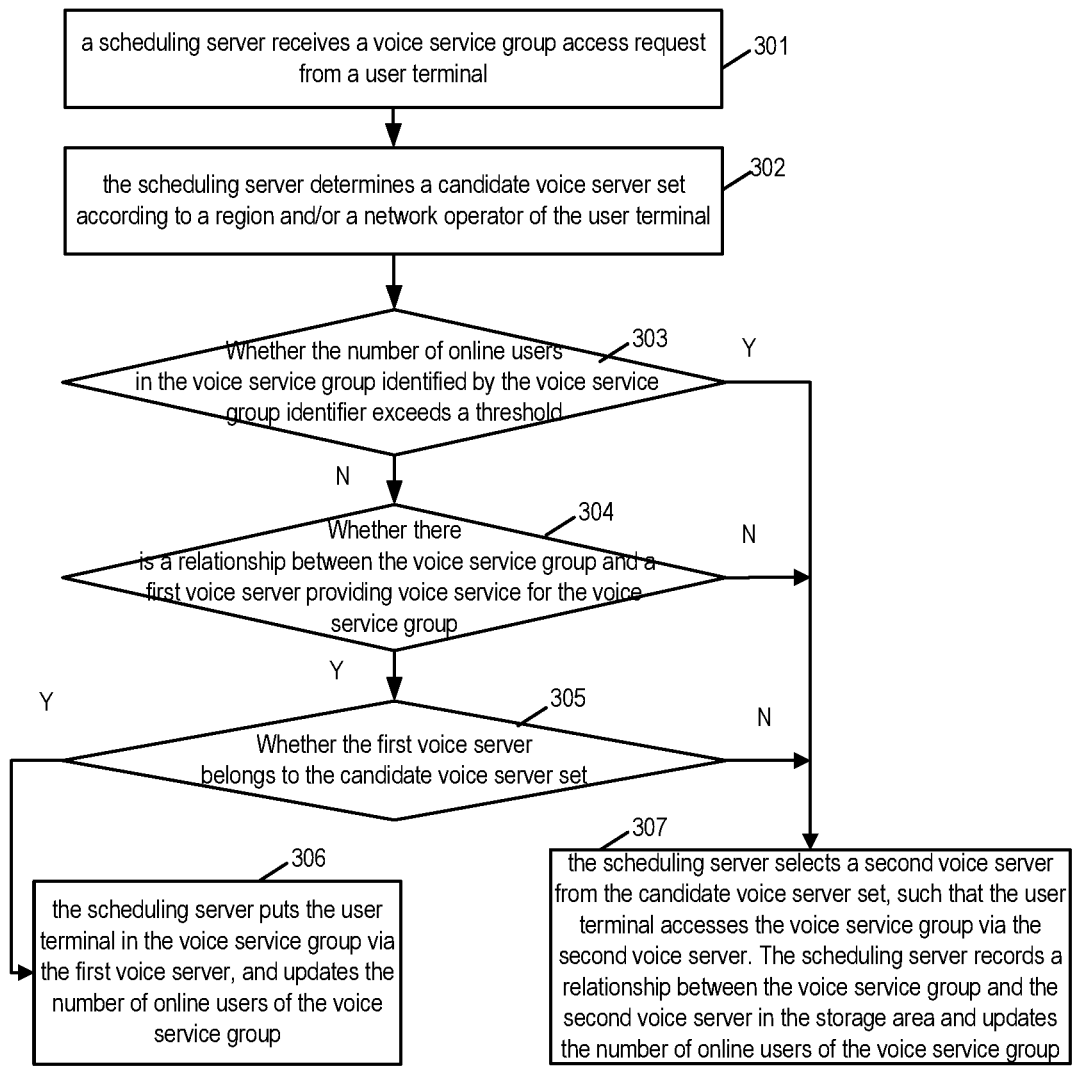
FIG. 3 shows another example of a method for voice service access according to the present disclosure.

FIG. 3 shows another example of a method for voice service access according to the present disclosure. As shown in FIG. 3, the method includes the following.

At block 301, a scheduling server receives a voice service group access request from a user terminal, wherein the voice service group access request carries a voice service group identifier.

This block is similar as block 201 and is not repeated herein.

At block 302, the scheduling server determines a candidate voice server set according to a region and/or a network operator of the user terminal.

This block is similar as block 202 and is not repeated herein.

At block 303, the scheduling server determines whether the number of online users in the voice service group identified by the voice service group identifier exceeds a threshold. If yes, block 307 is performed; otherwise, block 304 is performed.

In some examples of the present disclosure, the threshold may be a value between 30 and 50.

At block 304, the scheduling server searches a storage area for a relationship between the voice service group and a first voice server providing voice service for the voice service group. If the relationship is found, block 305 is performed; otherwise, bock 307 is performed.

At block 305, the scheduling server determines whether the first voice server belongs to the candidate voice server set. If yes, block 306 is performed; otherwise, block 307 is performed.

At block 306, the scheduling server puts the user terminal in the voice service group via the first voice server, and updates the number of online users of the voice service group.

At block 307, the scheduling server selects a second voice server from the candidate voice server set, such that the user terminal accesses the voice service group via the second voice server. The scheduling server records a relationship between the voice service group and the second voice server in the storage area and updates the number of online users of the voice service group.

In some examples of the present disclosure, the second voice server may be selected from the candidate voice server set based on a random algorithm or a hash algorithm or other algorithms. The hash algorithm may be modulo-hash algorithm or other hash algorithms. An input of the modulo-hash algorithm may be a numeric string corresponding to the voice service group. Denominator of the modulo-hash algorithm may be the total number of voice servers in the candidate voice server set. The numeric string may be the voice service group identifier or converted from the voice service group identifier. Thus, it may be realized that different voice servers provide services for different voice service groups. Alternatively, a voice server meeting a predefined load condition may be selected from the candidate voice server set as the second voice server. For example, a voice server whose load is lower than a threshold or has the lowest load may be selected from the candidate voice server set and taken as the second voice server.

Figure 4:
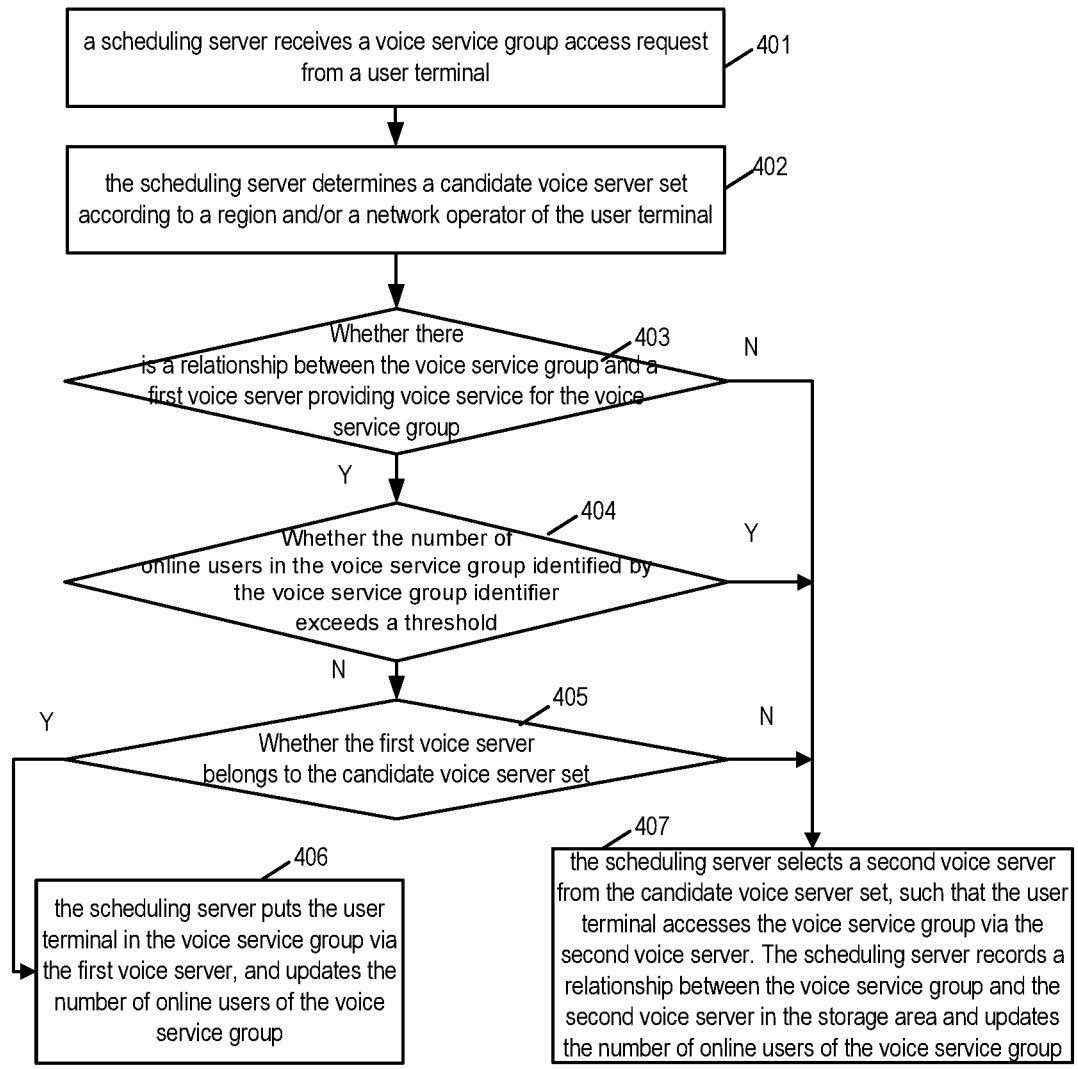
FIG. 4 shows still another example of a method for voice service access according to the present disclosure.

FIG. 4 shows still another example of a method for voice service access according to the present disclosure. As shown in FIG. 4, the method includes the following.

At block 401, a scheduling server receives a voice service group access request from a user terminal, wherein the voice service group access request carries a voice service group identifier.

This block is similar as block 201 and is not repeated herein.

At block 402, the scheduling server determines a candidate voice server set according to a region and/or a network operator of the user terminal.

This block is similar as block 202 and is not repeated herein.

At block 403, the scheduling server searches a storage area for a relationship between the voice service group and a first voice server providing voice service for the voice service group. If the relationship is found, block 404 is performed; otherwise, bock 407 is performed.

At block 404, the scheduling server determines whether the number of online users in the voice service group identified by the voice service group identifier exceeds a threshold. If yes, block 407 is performed; otherwise, block 405 is performed.

In some examples of the present disclosure, the threshold may be a value between 30 and 50.

At block 405, the scheduling server determines whether the first voice server belongs to the candidate voice server set. If yes, block 406 is performed; otherwise, block 407 is performed.

At block 406, the scheduling server puts the user terminal in the voice service group via the first voice server, and updates the number of online users of the voice service group.

At block 407, the scheduling server selects a second voice server from the candidate voice server set, and puts the user terminal in the voice service group via the second voice server, records a relationship between the voice service group and the second voice server in the storage area, and updates the number of online users of the voice service group.

In some examples of the present disclosure, the second voice server may be selected from the candidate voice server set based on a random algorithm or a hash algorithm or other algorithms. The hash algorithm may be modulo-hash algorithm or other hash algorithms. An input of the modulo-hash algorithm may be a numeric string corresponding to the voice service group. Denominator of the modulo-hash algorithm may be the total number of voice servers in the candidate voice server set. The numeric string may be the voice service group identifier or converted from the voice service group identifier. Thus, it may be realized that different voice servers provide services for different voice service groups. Alternatively, a voice server meeting a predefined load condition may be selected from the candidate voice server set as the second voice server. For example, a voice server whose load is lower than a threshold or has the lowest load may be selected from the candidate voice server set and taken as the second voice server.

Figure 5:
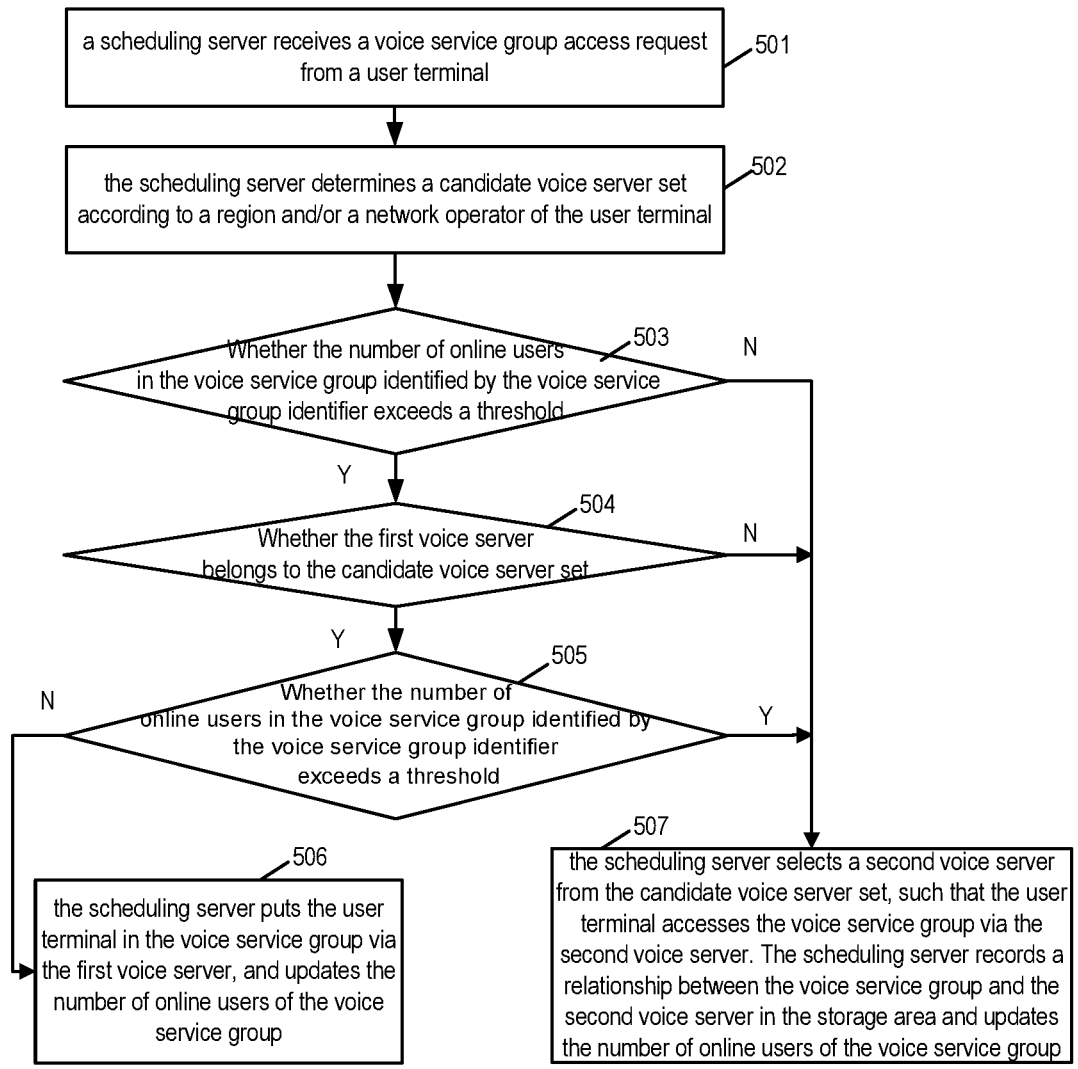
FIG. 5 shows yet another example of a method for voice service access according to the present disclosure.

FIG. 5 shows yet another example of a method for voice service access according to the present disclosure. As shown in FIG. 5, the method includes the following.

At block 501, a scheduling server receives a voice service group access request from a user terminal, wherein the voice service group access request carries a voice service group identifier.

This block is similar as block 201 and is not repeated herein.

At block 502, the scheduling server determines a candidate voice server set according to a region and/or a network operator of the user terminal.

This block is similar as block 202 and is not repeated herein.

At block 503, the scheduling server searches a storage area for a relationship between the voice service group and a first voice server providing voice service for the voice service group. If the relationship is found, block 504 is performed; otherwise, bock 507 is performed.

At block 504, the scheduling server determines whether the first voice server belongs to the candidate voice server set. If yes, block 505 is performed; otherwise, block 507 is performed.

At block 505, the scheduling server determines whether the number of online users in the voice service group identified by the voice service group identifier exceeds a threshold. If yes, block 507 is performed; otherwise, block 506 is performed.

In some examples of the present disclosure, the threshold may be a value between 30 and 50.

At block 506, the scheduling server puts the user terminal in the voice service group via the first voice server, and updates the number of online users of the voice service group.

At block 507, the scheduling server selects a second voice server from the candidate voice server set, and puts the user terminal in the voice service group via the second voice server, records a relationship between the voice service group and the second voice server in the storage area, and updates the number of online users of the voice service group.

In some examples of the present disclosure, the second voice server may be selected from the candidate voice server set based on a random algorithm or a hash algorithm or other algorithms. The hash algorithm may be modulo-hash algorithm or other hash algorithms. An input of the modulo-hash algorithm may be a numeric string corresponding to the voice service group. Denominator of the modulo-hash algorithm may be the total number of voice servers in the candidate voice server set. The numeric string may be the voice service group identifier or converted from the voice service group identifier. Thus, it may be realized that different voice servers provide services for different voice service groups. Alternatively, a voice server meeting a predefined load condition may be selected from the candidate voice server set as the second voice server. For example, a voice server whose load is lower than a threshold or has the lowest load may be selected from the candidate voice server set and taken as the second voice server.

For better understand of various aspects of the examples of the present disclosure, several detailed application scenarios are provided hereinafter.

Example 1

Suppose that a voice service room currently includes 20 online users. The threshold is 30 and the number of current online users does not exceed the threshold. The scheduling server receives the voice service room access request which carries an identifier of the voice service room. The scheduling server determines a candidate voice server set according to the region and network operator of the user terminal. If the scheduling server finds the relationship between the voice service room and a first voice server in the storage area and the first voice server belongs to the candidate voice server set, the scheduling server puts the user terminal in the voice service room via the first voice server and updates the number of online users of the voice service room to 21.

Example 2

Suppose that a voice service room currently includes 25 online users. The threshold is 30 and the number of current online users does not exceed the threshold. The scheduling server receives the voice service room access request which carries an identifier of the voice service room. The scheduling server determines a candidate voice server set according to the region and network operator of the user terminal. If the scheduling server finds the relationship between the voice service room and the first voice server in the storage area but the first voice server does not belong to the candidate voice server set, the scheduling server selects a second voice server from the candidate voice server set, puts the user terminal in the voice service room via the second voice server and updates the number of online users of the voice service room to 26.

Example 3

Suppose that a voice service room currently includes 45 online users. The threshold is 30 and the number of current online users exceeds the threshold. The scheduling server receives the voice service room access request which carries an identifier of the voice service room. The scheduling server determines a candidate voice server set according to the region and network operator of the user terminal. The scheduling server selects a third voice server from the candidate voice server set, puts the user terminal in the voice service room via the third voice server and updates the number of online users of the voice service room to 46.

In view of the above, when the voice service room has relatively less online users, the number of voice servers providing services for the voice service room may be reduced as much as possible, so as to reduce forwarding times of voice chat data of users, shorten forwarding paths and reduce delay. When the voice server providing voice service is selected, key factors such as region of the terminal and/or network operator of the user terminal are also considered, such that influence of these factors on the delay may be balanced to obtain a stable delay index and a better user experience.

It is found in a small-scale voice service room scenario that, short delays account for 10% during peak period. The concentration of voice service on some voice servers of the voice service room not only reduces forwarding traffic between different servers but also increases utilization ratio of the voice server. During the peak period, the utilization ratio may be increased by 8%.

Figure 6:
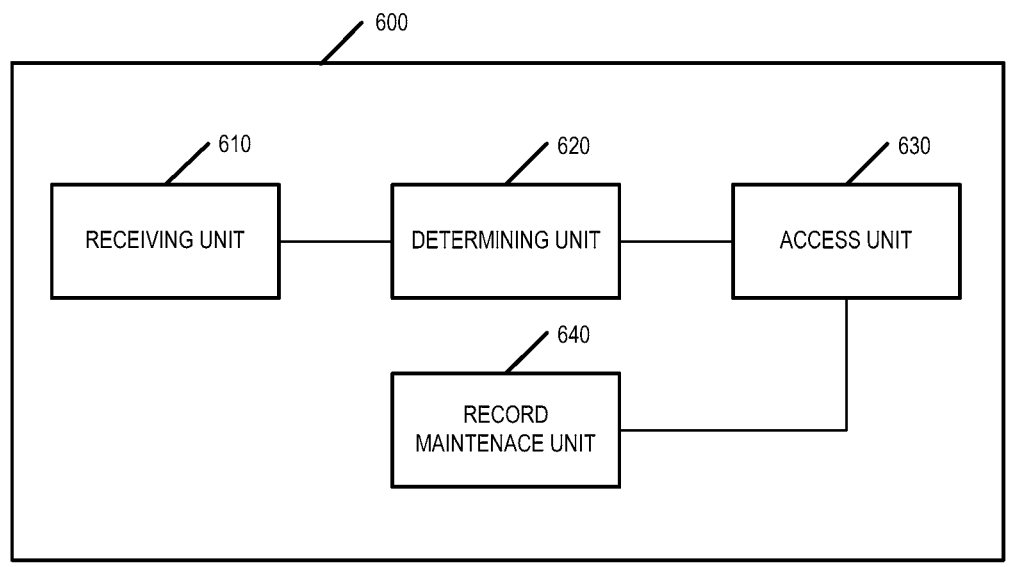
FIG. 6 shows an example of an apparatus for voice service access according to the present disclosure.

In accordance with the above technical solution, an example of the present disclosure provides an apparatus for voice service access. As shown in FIG. 6, the apparatus 600 includes a receiving unit 610, a determining unit 620, an access unit 630 and a record maintenance unit 640.

The receiving unit 610 is to receive a voice service group access request from a user terminal, wherein the voice service group access request includes a voice service group identifier.

The determining unit 620 is to determine a candidate voice server set according to a region and/or network operator of the user terminal.

The access unit 630 is to put the user terminal in the voice service group if the number of online users in the voice service group identified by the voice service group identifier does not exceed a threshold and a relationship between the voice service group and a first voice server is recorded in the record maintenance unit 640 and the first voice server belongs to the candidate voice server set.

The record maintenance unit 640 is to record the relationship between the voice service group and the first voice server.

In some examples of the present disclosure, the determining unit 620 may select voice servers from the voice servers corresponding to the region where the user terminal is located based on a predefined load controlling policy or other policies to form the candidate voice server set. For example, the determining unit 620 may select voice servers with loads lower than a threshold among the voice servers corresponding to the region of the user terminal to form the candidate voice server set.

In some examples of the present disclosure, the determining unit 620 may select voice servers from the voice servers corresponding to the network operator where the user terminal is located based on a predefined load controlling policy or other policies to form the candidate voice server set. For example, the determining unit 620 may select voice servers with loads lower than a threshold among the voice servers corresponding to the network operator of the user terminal to form the candidate voice server set.

In some examples of the present disclosure, the determining unit 620 may select voice servers from the voice servers corresponding to the region and network operator where the user terminal is located based on a predefined load controlling policy or other policies to form the candidate voice server set. For example, the determining unit 620 may select voice servers with loads lower than a threshold among the voice servers corresponding to the region and network operator of the user terminal to form the candidate voice server set.

In some examples of the present disclosure, the value of the threshold may be between 30 and 50.

In some examples of the present disclosure, the access unit 630 is further to select a second voice server from the candidate voice server set and put the user terminal in the voice service group via the second voice server if the number of online users in the voice service group identified by the voice service group identifier does not exceed the threshold and no relationship between the voice service group and voice server is found in the storage area.

At this time, the record maintenance unit 640 is further to record a relationship between the voice service group and the second voice server.

In some examples of the present disclosure, the access unit 630 is further to select the second voice server from the candidate voice server set based on a random algorithm or a hash algorithm.

The access unit 630 may also select the second voice server meeting a predefined load condition from the candidate voice server set, e.g., select the second voice server with the lowest load or with a load lower than a threshold from the candidate voice server set.

In some examples of the present disclosure, if the number of online users of the voice service group identified by the voice service group identifier does not exceed the threshold, the relationship between the voice service group and the first voice server is found in the maintenance unit 640 but the first voice server does not belong to the candidate voice server set, the access unit 630 is further to select a third voice server from the candidate voice server set and put the user terminal in the voice service group via the third voice server. For example, the access unit 630 may select the third voice server from the candidate voice server set based on a random algorithm or a hash algorithm. Or, the access unit 630 may also select the third voice server meeting a predefined load condition from the candidate voice server set, e.g., select the third voice server with the lowest load or with a load lower than a threshold from the candidate voice server set. In addition, the record maintenance unit 640 is further to record a relationship between the voice service group and the third voice server in the storage area.

In some examples of the present disclosure, if the number of online users in the voice service group identified by the voice service group identifier exceeds the threshold, the access unit 630 is further to select a fourth voice server from the candidate voice server set and put the user terminal in the voice service group via the fourth voice server. For example, the access unit 630 may select the fourth voice server from the candidate voice server set based on a random algorithm or a hash algorithm. Or, the access unit 630 may also select the fourth voice server meeting a predefined load condition from the candidate voice server set, e.g., select the fourth voice server with the lowest load or with a load lower than a threshold from the candidate voice server set. In addition, the record maintenance unit 640 is further to record a relationship between the voice service group and the fourth voice server in the storage area.

Functions of the functional units of the scheduling server 600 may be implemented based on the method examples described above and are not repeated herein.

In view of the above, in examples of the present disclosure, after a voice service group access request is received by the scheduling server 600 from a user terminal, a candidate voice server set is determined according to a region and/or network operator of the user terminal. If the number of online users in the voice service group identified by a voice service group identifier carried in the voice service group access request, a relationship between the voice service group and a first voice server is recorded in the storage area and the first voice server belongs to the candidate voice server set, the user terminal accesses the voice service group via the first voice server. Thus, in the case that the voice service group has less users, the user terminals may access the voice service group via the first voice server which is currently providing services for the voice service group as far as possible, so as to reduce forwarding times of voice chat data of users, shorten forwarding path and reduce delay. When the voice server providing voice service is selected, key factors such as region and/or network operator of the user terminal are also considered, such that influence of these factors on the delay may be balanced to obtain a stable delay index and a better user experience.

Figure 7:
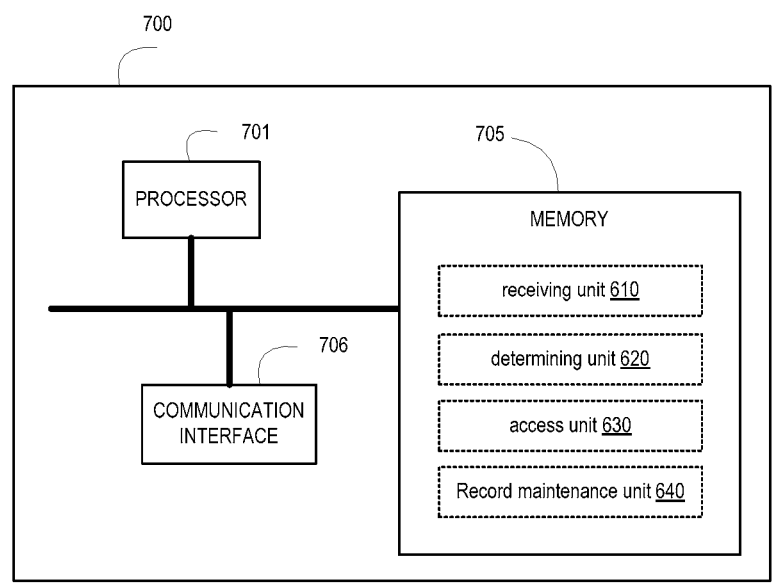
FIG. 7 shows an example of a scheduling server according to the present disclosure.

FIG. 7 shows another example of a scheduling server according to the present disclosure. As shown in FIG. 7, the scheduling server 700 includes: one or more processors 701, a communication interface 706 and a memory 705.

The communication interface 706 includes a port to connect to a communication network. The memory 705 stores machine readable instructions executable by the one or more processors 701 to implement the functions of the access unit 610, determining unit 620, the access unit 630, and the record maintaining unit 640 as shown in FIG. 6.

The memory in the embodiments of the present disclosure is non-transitory processor-readable storage media which may be, for example, a RAM memory, flash memory, ROM memory, EPROM memory, EEPROM memory, registers, hard disk, a removable disk, a CD-ROM, or any other form of non-transitory storage medium known in the art.

What has been described and illustrated herein is an example of the disclosure along with some of its variations. The terms, descriptions and figures used herein are set forth by way of illustration. Many variations are possible within the spirit and scope of the disclosure, which is intended to be defined by the following claims and their equivalents.

What is claimed is:

1. A method for voice service access, comprising:
   receiving a voice service group access request from a user terminal, wherein the voice service group access request carries an identifier of a voice service group that a user of the user terminal is to join;
   determining a candidate voice server set according to a region where the user terminal is located and/or a network operator of the user terminal;
   if the number of online users in the voice service group identified by the identifier in the voice service group access request does not exceed a predefined threshold, a relationship between the voice service group and a first voice server providing services for the voice service group is found in a storage area and the first voice server belongs to the candidate voice server set, putting the user terminal in the voice service group via the first voice server; and
   if the number of online users in the voice service group identified by the identifier in the voice service group access request does not exceed the predefined threshold, the relationship between the voice service group and the first voice server is found in the storage area but the first voice server does not belong to the candidate voice server set, selecting a third voice server from the candidate voice server set and putting the user terminal in the voice service group via the third voice server.

2. The method of claim 1, wherein the determining candidate voice server set according to the region where the user terminal is located and/or the network operator of the user terminal comprises: determining the candidate voice server set according to loads of voice servers corresponding to the region where the user terminal is located; or determining the candidate voice server set according to loads of voice servers corresponding to the network operator of the user terminal; or, determining the candidate voice server set according to voice servers corresponding to the region and the network operator of the user terminal.

3. The method of claim 1, wherein the predefined threshold is a value between 30 and 50.

4. The method of claim 1, further comprising:
   if the number of online users in the voice service group identified by the identifier in the voice service group access request does not exceed the predefined threshold and the relationship between the voice service group and the first voice server is not found in the storage area, selecting a second voice server from the candidate voice server set and putting the user terminal in the voice service group via the second voice server.

5. The method of claim 4, further comprising:
   recording a relationship between the voice service group and the second voice server in the storage area.

6. The method of claim 5, wherein the selecting the second voice server from the candidate voice server set comprises:
   selecting the second voice server from the candidate voice server set based on a random algorithm or a hash algorithm.

7. The method of claim 6, wherein the hash algorithm is a modulo-hash algorithm.

8. The method of claim 7, wherein an input of the modulo-hash algorithm is a numeric string corresponding to the voice service group, a denominator of the modulo-hash algorithm is a total number of voice servers in the candidate voice server set.

9. The method of claim 1, further comprising:
if the number of online users in the voice service group identified by the identifier in the voice service group access request exceeds the predefined threshold, selecting a fourth voice server from the candidate voice server set and putting the user terminal in the voice service group via the fourth voice server.

10. An apparatus for voice service access, comprising:
a receiving unit, to receive a voice service group access request from a user terminal, wherein the voice service group access request includes an identifier of a voice service group that a user of the user terminal is to join;
a determining unit, to determine a candidate voice server set according to a region where the user terminal is located and/or a network operator of the user terminal;
an access unit, to put the user terminal in the voice service group if the number of online users in the voice service group identified by the identifier does not exceed a predefined threshold and a relationship between the voice service group and a first voice server providing services for the voice service group is recorded in a record maintenance unit and the first voice server belongs to the candidate voice server set; and
the record maintenance unit, to record the relationship between the voice service group and the first voice server,
wherein the access unit is further to select a third voice server from the candidate voice server set and put the user terminal in the voice service group via the third voice server if the number of online users in the voice service group identified by the identifier in the voice service group access request does not exceed the predefined threshold, the relationship between the voice service group and the first voice server is found but the first voice server does not belong to the candidate voice server set.

11. The apparatus of claim 10, wherein the determining unit is further to determine the candidate voice server set according to loads of voice servers corresponding to the region where the user terminal is located; or determine the candidate voice server set according to loads of voice servers corresponding to the network operator of the user terminal; or determine the candidate voice server set according to loads of voice servers corresponding to the region and the network operator of the user terminal.

12. The apparatus of claim 10, wherein the access unit is further to, if the number of online users in the voice service group identified by the identifier in the voice service group access request does not exceed the predefined threshold and the relationship between the voice service group and the first voice server is not found, select a second voice server from the candidate voice server set and put the user terminal in the voice service group via the second voice server.

13. The apparatus of claim 12, wherein the record maintenance unit is further to record a relationship between the voice service group and the second voice server.

14. The apparatus of claim 10, wherein the access unit is further to select, if the number of online users in the voice service group identified by the identifier in the voice service group access request exceeds the predefined threshold, a fourth voice server from the candidate voice server set and put the user terminal in the voice service group via the fourth voice server.

15. A voice service system, comprising: a scheduling server and voice servers scheduled by the scheduling server;
wherein the scheduling server is to receive a voice service group access request from a user terminal, wherein the voice service group access request carries an identifier of a voice service group that a user of the user terminal is to join; determine a candidate voice server set according to a region where the user terminal is located and/or a network operator of the user terminal; if the number of online users in the voice service group corresponding to the identifier does not exceed a predefined threshold, a relationship between the voice service group and a first voice server providing services for the voice service group is found in a storage area of the scheduling server and the first voice server belongs to the candidate voice server set, put the user terminal in the voice service group via the first voice server, and
the scheduling server is further to select a third voice server from the candidate voice server set and put the user terminal in the voice service group via the third voice server if the number of online users in the voice service group identified by the identifier does not exceed the predefined threshold, the relationship between the voice service group and the first voice server is found but the first voice server does not belong to the candidate voice server set.

16. The voice service system of claim 15, wherein the scheduling server is further to select, if the number of online users in the voice service group identified by the identifier does not exceed the predefined threshold and the relationship between the voice service group and the first voice server is not found in the storage area, a second voice server from the candidate voice server set and put the user terminal in the voice service group via the second voice server.

17. The voice service system of claim 15, wherein the scheduling server is further to select, if the number of online users in the voice service group identified by the identifier in the voice service group access request exceeds the predefined threshold, a fourth voice server from the candidate voice server set and put the user terminal in the voice service group via the fourth voice server.

* * * * *